L. C. PRITCHARD.
STEERING WHEEL.
APPLICATION FILED FEB. 24, 1917.
1,232,969.
Patented July 10, 1917.
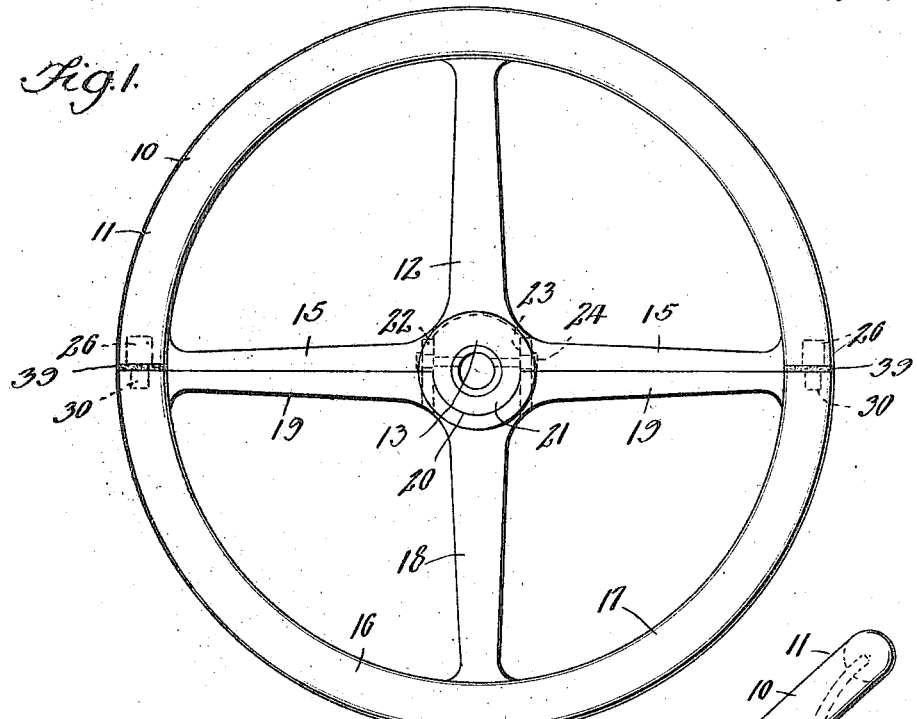
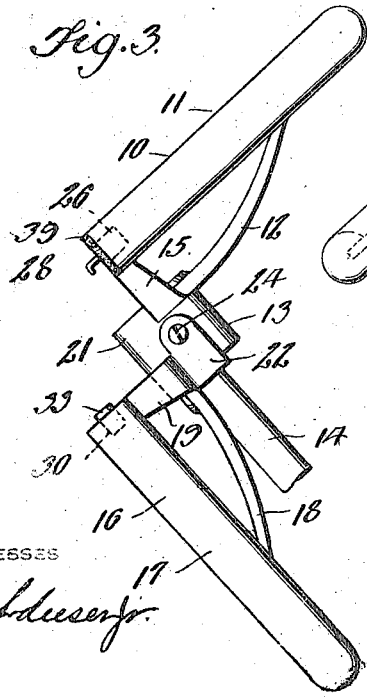
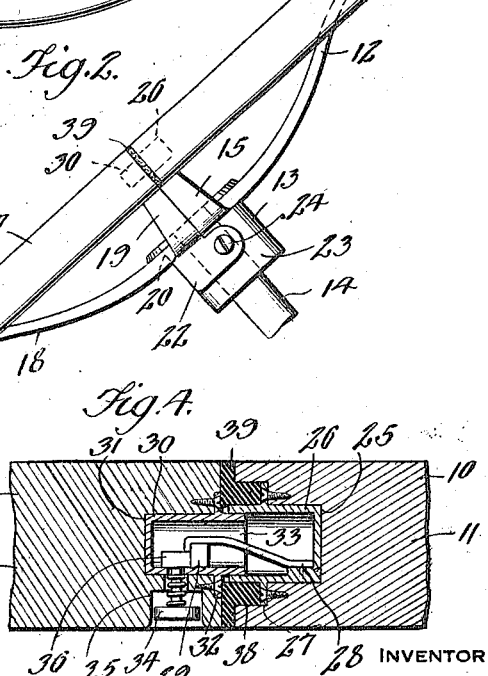
WITNESSES
INVENTOR
L. C. Pritchard,
BY Victor J. Evans
ATTORNEY

UNITED STATES PATENT OFFICE.

LEWIS C. PRITCHARD, OF CLEVELAND, OHIO, ASSIGNOR TO INTERNATIONAL SAV-A-LIFE FENDER CO., OF CLEVELAND, OHIO, A CORPORATION OF WEST VIRGINIA.

STEERING-WHEEL.

1,232,969.      Specification of Letters Patent.      Patented July 10, 1917.

Application filed February 24, 1917. Serial No. 150,817.

*To all whom it may concern:*

Be it known that I, LEWIS C. PRITCHARD, a citizen of the United States, residing at Cleveland, in the county of Cuyahoga and State of Ohio, have invented new and useful Improvements in Steering-Wheels, of which the following is a specification.

This invention relates to steering wheels especially adapted for use in connection with motor vehicles.

The object of the invention is to provide a steering wheel which is formed in sections, one of which is capable of being swung downwardly so as to provide additional space, in order that the operator of the vehicle may more conveniently enter or leave the seat, the manner of operating the swinging section permitting its use in connection with vehicles whose controlling levers are mounted on top of the steering wheel.

Another object is to provide a sectional steering wheel, in which one of the sections will be rigidly secured to the steering post, so as to be always in position for use and by means of which the vehicle may be steered irrespective of the position of the other section.

A further object is to provide means for locking the sections of the wheel together, which are so arranged within the rim of the wheel as not to interfere with its proper use, the said locking means securely holding the sections in position to form a complete wheel.

With these and other objects in view, the invention consists of the following novel combination and arrangement of parts hereinafter more fully described, illustrated in the accompanying drawings and pointed out in the appended claims.

In the drawings:—

Figure 1 is a top plan view of a steering wheel embodying the present invention;

Fig. 2 is a side elevation of the same.

Fig. 3 is a similar view showing the pivoted section of the wheel in its downward position.

Fig. 4 is an enlarged detail section through the latch mechanism.

In the construction of sectional steering wheels, it must be borne in mind that they must be always ready for use irrespective of the position of the swinging section. It must also be borne in mind that in the operation of motor driven vehicles there is a good deal of strain to be borne by the wheel, especially in braking the vehicle in the operation of stopping. During this operation the driver will exert an upward force upon the rim of the wheel, due to the downwardly exerted pressure of his feet on the brakes, this upward force being in the nature of a bracing action to enable him to more quickly and readily apply the brakes. For this reason it is desirable that the pivoted section of the wheel swing downwardly, as the bracing action just described will tend to hold the sections in operative engagement, whereas, if the pivoted section was mounted to swing upward this strain would tend to disengage the sections which would result in an accident to either the vehicle or the driver. Another advantage of this downward swinging section, is that it provides additional room between the wheel and the driver's seat, so as to more readily adapt itself to stout persons, as the pivoted section would swing downward and away from the driver, whereas if the sections swung upwardly this first movement would be toward the driver due to the inclination of the wheel. The particular form of wheel shown and described also enables its use in connection with vehicles whose spark and gasolene controlling levers are mounted upon the top of the steering wheel, as is now the custom in motor driven vehicles.

The present invention overcomes the numerous disadvantages set forth and embodies the advantages and to this end the wheel comprises a rigidly mounted section which is indicated at 10. This section includes the rim 11 and spokes 12, by means of which the said rim is rigidly secured to the hub 13, which in turn is mounted upon the steering post 14, a section of which is illustrated.

The hub 13 is formed integral with the spokes, two of which are indicated at 15, these being half spokes as shown so as to coöperate with similar spokes carried by the other section of the wheel to be later described.

The opposite section of the wheel which is indicated at 16 includes the rim 17 and the spokes 18 and 19, the last mentioned spokes being complemental to the spokes 15, so that when the two sections of the wheel are locked together they will coöperate to form complete spokes. The section 16 is formed with a semi-circular seat 20, within which is seated a semi-circular reduced portion 21 formed on the hub 13. Formed integral with the portion of the section 16 in which the seat 20 is provided, are depending lugs or ears 22, which are pivotally secured to the flanged sides 23 of the hub 13 which they embrace, the pivots thereof being indicated at 24.

Seated within sockets 25 formed in the opposite ends of the rim 11 are tubular members 26, these members being provided with flanges 27 by means of which they are held in place. Carried by the tubular members 26 are spring latches 28, these latches extending beyond the ends of the members 26 for the purpose of engaging lugs 29 carried by tubular members 30, which are seated in depressions or sockets 31 formed in the opposed ends of the section 16. The tubular members 30 are also provided with attaching flanges 32 and have a flange 33 projecting beyond the ends of the wheel rim, so as to project a short distance within the tubular members 26 for the purpose of stiffening the joints between the sections when the wheel is in its locked position. The members 30 are each provided with spring controlled operating buttons 34 which operate in countersunk portions 35, the shank of these buttons carrying upon their inner ends a head 36 which is adapted to be positioned beneath the free end of the spring catch 28 for the purpose of releasing the sections. The rim section 11 is further provided with a seat 38 within which is mounted an annular buffer 39 formed of rubber or other suitable material, the peripheral edge of which is flush with the transverse diameter of the rim sections so as to permit a tight joint between these sections and to provide a smooth gripping surface for the wheel.

It is believed from the foregoing that the construction and operation of the invention will be apparent to those skilled in the art. The right is reserved to make such changes as may fall within the scope of the appended claims, for example a different form of latch may be substituted for that shown, or a clamp or other securing means may be provided for the sections 15 and 19 for the purpose of securing the sections of the wheel together.

Having described the invention what is claimed, is;

1. A sectional steering wheel comprising a hub, a section rigidly secured thereto, a section pivoted to said hub and means for locking said sections together to form a complete wheel.

2. A steering wheel comprising a pair of opposed sections, one of said sections having a hub rigidly secured thereto, depending ears carried by the opposite section for pivotal engagement with said hub and means for locking said sections together to form a complete wheel.

3. A sectional steering wheel comprising a positively mounted section, a downwardly swinging section and means located within the rim of the wheel for locking said sections together to form a complete wheel.

4. A sectional steering wheel comprising a positively mounted section, a downwardly swinging section, a latch carried by one of said rim sections, a keeper carried by the other section for locking the said sections together to form a complete wheel and interlocking housings for said latch and keeper.

5. A sectional steering wheel comprising a positively mounted section, a downwardly swinging section and a plunger operated latch located within the rim of the wheel for locking the said sections together to form a complete wheel.

In testimony whereof I affix my signature.

LEWIS C. PRITCHARD.